United States Patent
Farr

[11] 3,779,348
[45] Dec. 18, 1973

[54] SHOE-DRUM BRAKES
[75] Inventor: Glyn Philip Reginald Farr, Kenilworth, England
[73] Assignee: Girling Limited, Birmingham, England
[22] Filed: Sept. 2, 1971
[21] Appl. No.: 177,890

[30] Foreign Application Priority Data
Sept. 3, 1970 Great Britain.................. 42,112/70

[52] U.S. Cl. ...... 188/106 A, 188/79.5 GE, 188/364
[51] Int. Cl. ........................................... F16d 65/24
[58] Field of Search .............. 188/79.5 GE, 106 A, 188/106 F, 325, 331, 364; 11/11

[56] References Cited
UNITED STATES PATENTS
| | | | |
|---|---|---|---|
| 1,972,829 | 9/1934 | Oliver | 188/364 |
| 2,239,916 | 4/1941 | Hunt | 188/364 X |
| 2,281,150 | 4/1942 | Goepfrich | 188/106 A X |
| 2,347,366 | 4/1944 | Parnell | 188/364 X |
| 2,445,061 | 7/1948 | Goepfrich | 188/364 |
| 2,513,015 | 6/1950 | Fike | 188/364 X |
| 3,199,639 | 8/1965 | Newton | 188/106 A |

Primary Examiner—Duane A. Reger
Attorney—Scrivener, Parker et al.

[57] ABSTRACT

In hydraulic and mechanical actuating means for an internal shoe-drum brake an hydraulic slave cylinder has opposed aligned bores of different diameter in communication at their inner ends and a piston working in the bore of larger diameter acts on one shoe while a piston working in the bore of smaller diameter and a bell-crank lever mounted on the cylinder act on the other shoe.

3 Claims, 3 Drawing Figures

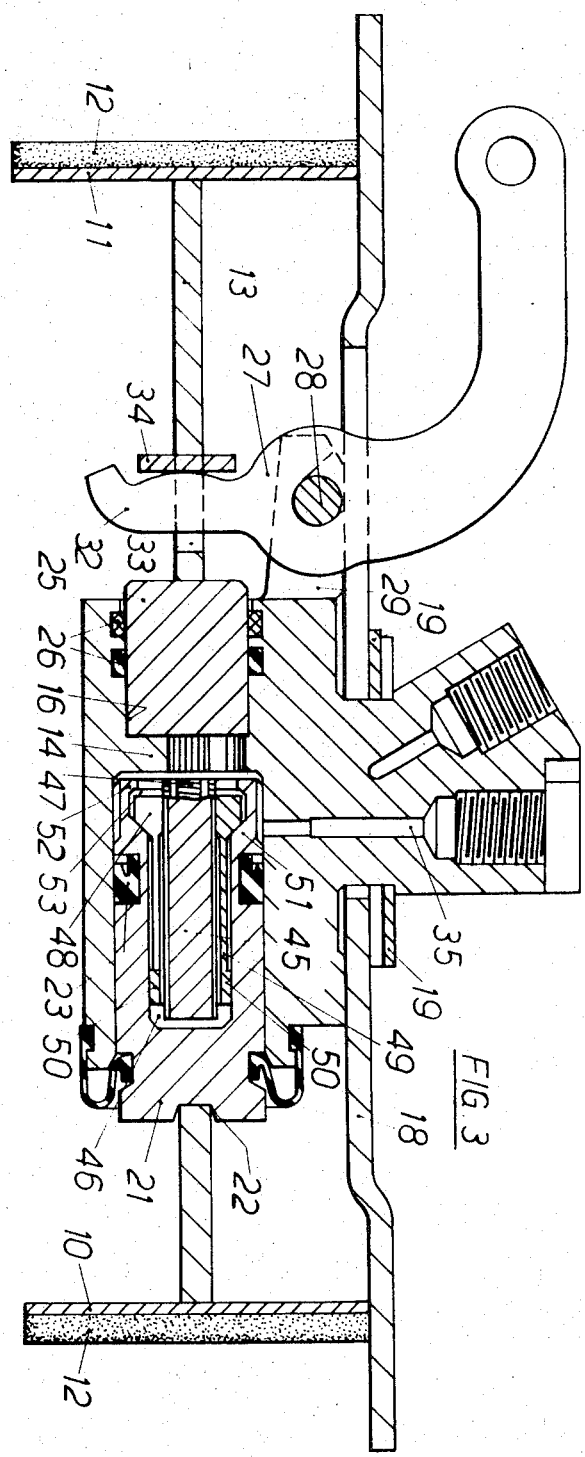

SHOE-DRUM BRAKES

This invention relates to improvements in internal shoe-drum brakes of the kind in which opposed arcuate shoes are separated at one end by an hydraulic slave cylinder which is mounted on the stationary back-plate of the brake for movement in a direction substantially parallel to the direction of movement of the shoe ends in the application of the brake, and the shoe ends are also separable by a mechanical actuator for parking or emergency braking.

One known form of mechanical actuator comprises a bell-crank lever pivotally mounted on the hydraulic cylinder and having one arm adapted to be coupled by any suitable transmission means to a hand-lever and a second arm which engages one of the shoe ends. When the lever is operated it urges that shoe into engagement with the drum and the reaction on the hydraulic cylinder moves the cylinder in the opposite direction to apply the other shoe.

When the vehicle has been in use for some time there is a tendency for the cylinder, owing to rust and dirt, to fail to move on the back-plate when the hand-brake is applied. Only one shoe is then operative and the efficiency of the brake is seriously reduced.

According to our invention, in a shoe-drum brake of the kind set forth the hydraulic slave cylinder has aligned bores of different diameter open at their outer ends and in communication at their inner ends, and a piston working in the bore of larger diameter engages one of the shoes while a piston working in the bore of smaller diameter engages the other shoe which is also engaged by one arm of a bell-crank lever pivotally mounted on the cylinder for applying the brake mechanically, and in the off position of the brake both pistons engage at their inner ends with stops in the cylinder which limit their inward movement and with which they are held in engagement by the usual pull-off springs acting on the shoes.

One advantage of this arrangement is that owing to the difference in the areas of the two pistons and the fact that the piston of smaller diameter and the bell-crank lever act on the same shoe the movement of the cylinders on the back plate produced by the reaction on the cylinder when the brake is applied takes place in one direction when the brake is applied hydraulically and in the opposite direction when it is applied mechanically.

In a preferred construction the two parts of the cylinder bore are not continuous but are in communication through a passage of less cross-sectional area than the part of the bore of smaller diameter so that the stops for the inward movement of the pistons are formed by shoulders in the cylinder at the inner ends of the parts of the cylinder bore in which the pistons work.

One practical embodiment of our invention and two modifications are illustrated by way of example in the accompanying drawings in which:

FIG. 3 is a similar section showing another form of automatic adjuster.

Figure 1:
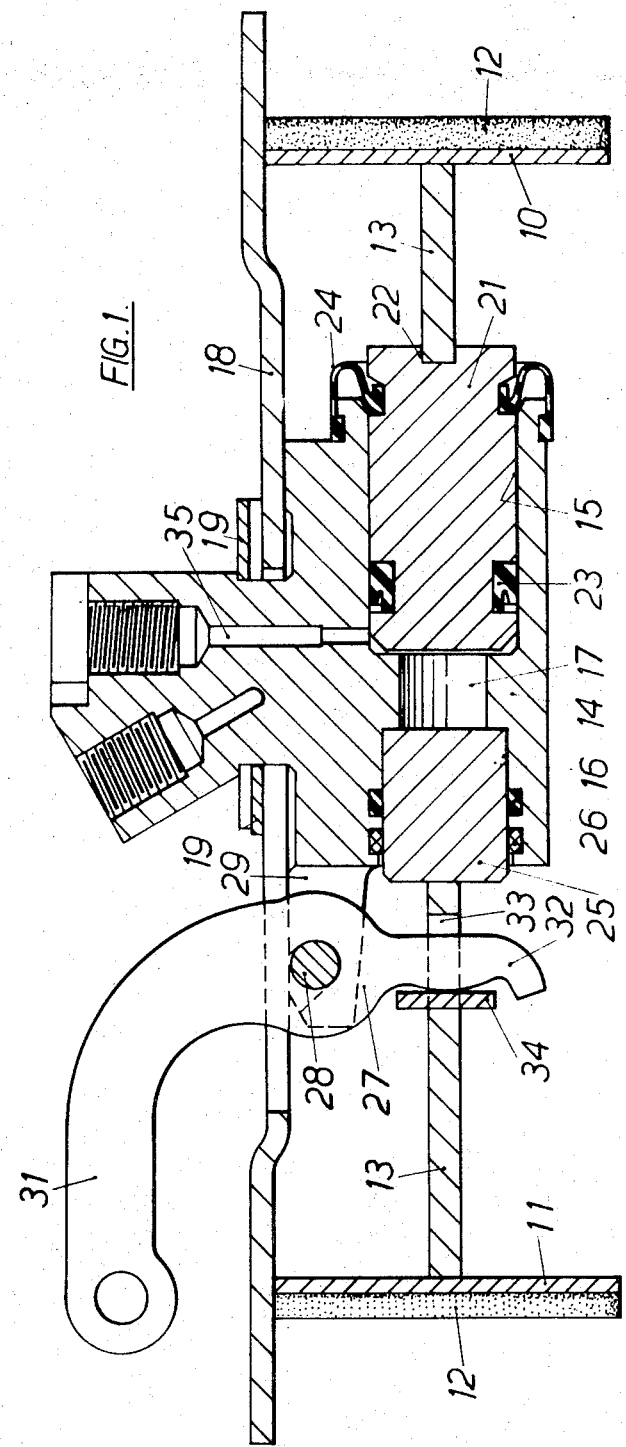
FIG. 1 is a longitudinal section of a wheel cylinder and the adjacent ends of the shoes of a shoe-drum brake.

In the embodiment shown in FIG. 1, 10, 11 are arcuate brake shoes carrying friction linings 12 and having webs 13. Located between the shoe ends is an hydraulic cylinder 14 having at one end an open-ended bore 15 and at the other end an aligned open-ended bore 16 of smaller diameter, the inner ends of the bores being connected by an axial passage 17 of smaller cross-sectional area than the bore 16.

The cylinder is mounted on the stationary back-plate 18 of the brake on which it is permitted limited movement in the direction of movement of the shoe ends against frictional resistance provided by spring washers 19.

A piston 21 works in the larger bore 15 in the cylinder and has in its outer end a notch 22 to receive the end of the web of the shoe 10. The piston is provided with a seal 23 and the outer end of the bore is sealed by a boot 24.

A piston 25 works in the smaller bore 16 through annular seals 26 located in grooves in the bore and engages at its outer end with the web of the shoe 11. In the off position of the brake both pistons are held in engagement with the shoulders or steps in the cylinder at the inner ends of their bores by pull-off springs (not shown) acting on the shoes. Hydraulic fluid under pressure for service application of the brake is supplied in the usual way by a pedal-operated master cylinder.

A bell-crank lever 27 is pivotally mounted on a pin 28 between lugs 29 on the cylinder which bear against the inner surface of the back-plate 18. One arm 31 of the lever extends through a slot in the back-plate and normally lies substantially parallel to the back-plate. The free end of this arm is adapted to be connected by a cable or other transmission member to a hand lever. The second arm 32 of the lever extends substantially at right angles to the back-plate and is engaged in a slot 33 in the web of the shoe 11 on which it is adapted to act through a slipper 34.

For normal service braking hydraulic fluid under pressure is supplied to the inner end of the bore 15. The pressure acts on both pistons but owing to the difference in the areas of the pistons only the larger piston 21 moves outwardly in its bore to apply the shoe 10. The reaction on the cylinder causes it to move to the left on the back-plate and the shoe 11 is applied through the smaller piston 25 which remains in engagement with the shoulder at the inner end of its bore.

When the brake is applied mechanically by the hand-lever the bell-crank lever 27 is moved angularly about its pivot 28 and urges the shoe 11 outwardly into engagement with the brake drum. The reaction on the pivot 28 which is mounted on the cylinder moves the cylinder to the right on the back-plate to apply the shoe 10 through the piston 21 which remains in engagement with the shoulder at the inner end of its bore.

It will be appreciated from the above description that the movement of the cylinder on the back-plate on application of the brake takes place in one direction when the brake is applied hydraulically and in the opposite direction when it is applied mechanically by the hand-lever. This helps to prevent the cylinder from sticking on the back-plate when rust and dirt have affected their co-operating surfaces.

If the hand-lever is actuated while the brake is held applied hydraulically by actuation of the foot pedal the movement of the cylinder produced by the reaction on the pivot pin 28 of the bell-crank lever will force the larger piston 21 into its bore in the cylinder and the smaller piston 25 will move outwardly and follow up the shoe 11 so that the hand-lever only has to overcome a force equal to that of the fluid pressure acting on an area equal to the difference between the areas of the two pistons.

Figure 2:
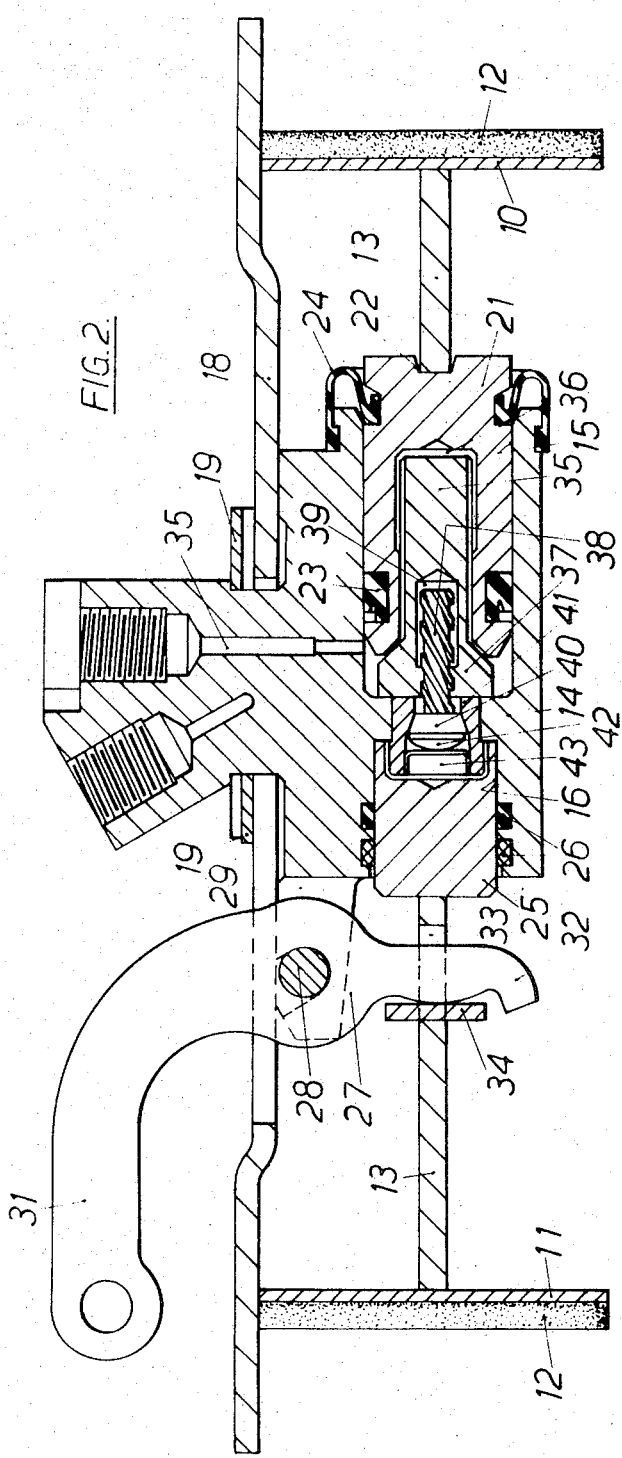
FIG. 2 is a similar section incorporating one form of automatic adjuster for the larger piston.

The arrangement shown in FIG. 2 is the same as that shown in FIG. 1 so far as the actuation of the brake is concerned and the same reference numerals have been applied to corresponding parts, but an automatic adjuster for the piston 21 is incorporated.

A spindle 35 is located in an axial recess 36 in the inner end of the piston 21 with which it is in screw-threaded engagement, the pitch of the thread being such that it is irreversible. The spindle has at its inner end a head 37 which is interposed between the inner end of the piston and the inner end of the cylinder bore and in effect forms an extension of the piston.

A screw 38 having a thread of steep pitch is located in an axial recess 39 in the inner end of the spindle 35 with which it is in screw-threaded engagement. The screw has a coned head 40 co-operating with a complementary coned surface in a bore in a sleeve 41 fixed in the cylinder body between the bores in which the pistons work, and a domed end face 42 on the head 39 bears on a cup 43 mounted in the sleeve.

There is sufficient play in the screw-threaded engagement between the spindle 35 and the screw 38 to provide a running clearance for the shoes in the off position of the brake.

When the brake is applied hydraulically the piston 21 moves to the right to apply the shoe 10 and takes the spindle 35 with it. When, owing to wear of the shoe linings, the movement of the piston exceeds the value set by the play between the spindle 35 and the screw 38 the spindle is rotated by its engagement with the screw 38 which is held against rotation by the engagement of its coned head with the sleeve 41. The effective axial length of the piston 21 is thus increased.

On release of the brake the screw 38 is pushed back by the piston and the coned head 40 is disengaged from the sleeve 41 and the screw can rotate freely within the spindle 35 to allow the piston and shoes to retract to their normal off positions.

Communication between the cylinder bores in which the pistons work is provided by a passage (not shown) in the body.

An alternative form of adjuster is shown in FIG. 3. This is a linear ratchet adjuster.

A rod 45 coaxial with the piston 21 is splined or otherwise fixed in the body of the cylinder between the bores. The rod extends into an axial recess 46 in the piston 21 and on its surface has four circumferentially spaced rows of ratchet teeth 47. Fitting over the rod within the recess is a nut member comprising four circumferentially spaced members 48 connected by longitudinally extending resilient fingers 49 to a continuous ring 50 fitting freely over the rod. The members 48 have internal ratchet teeth urged into engagement with the teeth on the rod by the resilient fingers 49, the direction of inclination of the teeth being such that the nut member can ride over the teeth in a direction towards the outer end of the piston but not in the reverse direction.

On their radially outer sides the members 48 have inclined faces 51 co-operating with a coned recess in the inner end of the piston which has an inwardly inclined annular lip 52 between which and the members 48 there is normally a clearance 53.

When the outward movement of the piston 21 in the application of the brake exceeds the clearance 53 the nut is pulled outwardly over the rod and rides over one or more of the ratchet teeth on the rod.

On release of the brake the inclined faces 51 of the members 48 will be engaged by the coned recess in the piston and the members will be urged inwardly so that the teeth on their inner edges will be forced into engagement with the ratchet teeth on the rod and the nut member will be prevented from returning along the rod so that the clearance 53 is re-established.

Communication between the cylinder bores in which the pistons work is provided by a passage 54 in the body.

I claim:

1. An internal shoe drum brake including a drum, a stationary backplate and opposed arcuate shoes which are separable at one end to apply the brakes against the drum by hydraulic actuating means or by mechanical actuating means, said hydraulic actuating means comprising a double acting hydraulic cylinder slideably mounted on the back plate for movement in a direction substantially parallel to the movement of the shoe ends in the application of the brake, said cylinder having aligned bores of different diameters open at their outer ends and in communication at their inner ends, a large piston working in the bore of larger diameter and engaging one of the shoes, a small piston working in the bore of smaller diameter and engaging the other shoe, stops for limiting inward movement of both pistons, said cylinder and pistons being constructed and arranged that when hydraulic pressure is applied to said pistons the larger piston applies the first shoe and the cylinder moves by reaction in the opposite direction to move said small piston through its stop against said second shoe to apply the same, said mechanical actuating means comprising a bell crank lever pivotally mounted on the cylinder adjacent the small piston and engageable with said other shoe upon actuation of said lever to apply said other shoe and by reaction to move said cylinder in the opposite direction to move said large piston through its stop against said first shoe to apply the same.

2. An internal shoe-drum brake as in claim 1 wherein said stops for the inward movement of the pistons are formed by shoulders at the inner ends of the bores in which they work, the bores being in communication through a passage of smaller cross-sectional area than the bore of smaller diameter.

3. An internal shoe-drum brake as in claim 1 wherein an automatic adjuster is incorporated for increasing the effective length of a piston when wear of the shoe linings has taken place.

* * * * *